(12) United States Patent
Catana Salazar et al.

(10) Patent No.: US 12,026,923 B2
(45) Date of Patent: Jul. 2, 2024

(54) OBJECT MODEL ENCODINGS

(71) Applicants: Hewlett-Packard Development Company, L.P., Spring, TX (US); Instituto Atlantico, Fortaleza (BR)

(72) Inventors: Juan Carlos Catana Salazar, Guadalajara (MX); Marco Antonio Medrano Acosta, Guadalajara (MX); Alyne Gomes Soares Cantal, Ceara (BR); Jun Zeng, Los Gatos, CA (US)

(73) Assignees: HEWLETT-PACKARD DEVELOPMENT COMPANY, L.P., Spring, TX (US); INSTITUTO ATLANTICO, Fortaleza/CE (BR)

( * ) Notice: Subject to any disclaimer, the term of this patent is extended or adjusted under 35 U.S.C. 154(b) by 21 days.

(21) Appl. No.: 17/552,219

(22) Filed: Dec. 15, 2021

(65) Prior Publication Data

US 2023/0186524 A1 Jun. 15, 2023

(51) Int. Cl.
*G06T 9/00* (2006.01)
*G06T 17/00* (2006.01)

(52) U.S. Cl.
CPC ............ *G06T 9/001* (2013.01); *G06T 17/005* (2013.01)

(58) Field of Classification Search
None
See application file for complete search history.

(56) References Cited

U.S. PATENT DOCUMENTS

| | | | |
|---|---|---|---|
| 10,279,545 B2 | 5/2019 | Urban et al. | |
| 2015/0066834 A1* | 3/2015 | Jeffries | H03M 7/3068 707/752 |
| 2017/0164809 A1* | 6/2017 | Wang | A47L 13/17 |
| 2018/0024215 A1* | 1/2018 | Zhu | G01R 33/4835 324/309 |
| 2020/0189200 A1* | 6/2020 | Mosher | B29C 64/343 |
| 2020/0361155 A1* | 11/2020 | Jones | G01B 11/0608 |
| 2021/0248811 A1* | 8/2021 | Shan | G06T 15/205 |
| 2021/0342991 A1* | 11/2021 | Jacob | G06T 7/30 |
| 2022/0392143 A1* | 12/2022 | Bressler | B29C 64/393 |
| 2023/0039130 A1* | 2/2023 | Peng | A61C 9/0053 |

FOREIGN PATENT DOCUMENTS

| | | | |
|---|---|---|---|
| CN | 103236079 A | | 8/2013 |
| CN | 104346832 A | | 2/2015 |
| CN | 109359534 A | | 2/2019 |
| CN | 110889903 A | | 3/2020 |
| CN | 112634172 A | * | 4/2021 |
| CN | 113468941 A | * | 10/2021 |

* cited by examiner

*Primary Examiner* — Aaron M Richer
(74) *Attorney, Agent, or Firm* — Shook, Hardy & Bacon L.L.P.

(57) ABSTRACT

Examples of methods are described herein. In some examples, a method includes determining a quantity of inner voxels in a canonical direction from each surface voxel of a set of surface voxels of a three-dimensional (3D) object model. In some examples, the method includes generating an encoded representation of the 3D object model, the encoded representation indicating a location of each surface voxel and the quantity of inner voxels for each surface voxel.

14 Claims, 5 Drawing Sheets

Determine a quantity of inner voxels in a canonical direction from each surface voxel of a set of surface voxels of a 3D object model — 102

Generate an encoded representation of the 3D object model, the encoded representation indicating a location of each surface voxel and the quantity of inner voxels for each surface voxel — 104

OBJECT MODEL ENCODINGS

BACKGROUND

Three-dimensional (3D) solid objects may be produced from a digital model using manufacturing. Additive manufacturing is an example of manufacturing. Additive manufacturing may be used in rapid prototyping, mold generation, mold master generation, and short-run manufacturing. Additive manufacturing involves the application of successive layers of build material. In some additive manufacturing techniques, the build material may be cured or fused. Other machining processes remove material to create the final object.

DETAILED DESCRIPTION

Additive manufacturing may be used to manufacture three-dimensional (3D) objects. 3D printing is an example of additive manufacturing. Some examples of 3D printing may selectively deposit an agent or agents (e.g., droplets) at a pixel level to enable control over voxel-level energy deposition. For instance, thermal energy may be projected over material in a build area, where a phase change (for example, melting and solidification) in the material may occur depending on the voxels where the agents are deposited.

A 3D object may be represented as data (e.g., a 3D object model). In some examples, an apparatus may receive a file or files of data and/or may generate a file or files of data. In some examples, the apparatus may generate data with model (s) created on the apparatus from an input or inputs (e.g., scanned object input, user-specified input, etc.). For instance, a 3D object may be represented by data (e.g., a 3D object model, a file, etc.) that indicates the shape and/or features of a 3D object. For instance, a 3D object may be represented as geometrical data, coordinate points, a mesh, a point cloud, and/or voxels, etc. In some examples, a 3D object may be represented by a geometrical mesh model, point cloud, voxels, 3D manufacturing format (3MF) file, an object (OBJ) file, computer aided design (CAD) file, and/or a stereolithography (STL) file, etc.

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. In some examples, voxels may be arranged along axes and/or aligned with axes. An example of 3D axes includes an x dimension, a y dimension, and a z dimension. In some examples, a quantity in the x dimension may be referred to as a width, a quantity in the y dimension may be referred to as a length, and/or a quantity in the z dimension may be referred to as a height. The x and/or y axes may be referred to as horizontal axes, and the z axis may be referred to as a vertical axis. Other orientations of the 3D axes may be utilized in some examples, and/or other definitions of 3D axes may be utilized in some examples.

In some examples, a voxel location may be expressed in coordinates. A voxel may have a size or resolution in an axis-aligned 3D grid. For instance, a voxel may be represented as a cuboid or rectangular prism aligned to a 3D coordinate grid, where the voxel location may be expressed as a centroid of the voxel in 3D coordinates (e.g., cartesian coordinates). In some examples, a voxel may have six faces, where voxel faces may be aligned to six canonical directions (e.g., top (or z+), bottom (z−), front (y+), back (y−), left (x−) and right (x+)). For instance, each voxel face may be perpendicular to a line that is parallel to a coordinate axis.

Examples of a voxel size dimension may include 25.4 millimeters (mm)/150=170 microns for 150 dots per inch (dpi), 490 microns for 50 dpi, 2 mm, 42 microns or 600 dpi, etc. The term "voxel level" and variations thereof may refer to a resolution, scale, or density corresponding to voxel size. A set of voxels may be utilized to represent a build volume.

A build volume is a volume in which an object or objects may be manufactured. A "build" may refer to an instance of 3D manufacturing. A layer is a portion of a build volume. For example, a layer may be a cross section (e.g., two-dimensional (2D) cross section) or 3D portion (e.g., rectangular prism, set of voxels, etc.) of a build volume. In some examples, a layer may refer to a horizontal portion (e.g., plane) of a build volume. In some examples, an "object" may refer to an area and/or volume in a layer and/or build volume indicated for forming a physical object. In some examples, a voxel representation of a 3D object model may include locations in a regular axis-aligned 3D grid. In some examples, a value of a voxel and/or a grouping of a voxel may indicate whether the voxel at a location is occupied (e.g., partially or completely occupied) by an object. Voxel representation may allow a 3D object model to be represented in a structured manner. For instance, voxels may represent 3D objects with a range of geometrical complexity.

In some examples of 3D manufacturing (e.g., Multi Jet Fusion), voxels in the build volume may undergo a thermal procedure (e.g., approximately 15 hours of build time (e.g., time for layer-by-layer printing) and approximately 35 hours of additional cooling). The thermal procedure of voxels that include an object may affect the manufacturing quality (e.g., functional quality) of the object.

In some examples, "powder" may indicate or correspond to particles. In some examples, an object may indicate or correspond to a location (e.g., voxels, area, volume, etc.) where particles are to be sintered, melted, and/or solidified. For example, an object may be formed from sintered or melted powder.

While plastics (e.g., polymers) may be utilized as a way to illustrate some of the approaches described herein, some the techniques described herein may be utilized in various examples of manufacturing. For instance, some examples may be utilized for plastics, polymers, semi-crystalline materials, metals, etc. Some additive manufacturing techniques may be powder-based and driven by powder fusion.

Some examples of the approaches described herein may be performed with area-based powder bed fusion-based additive manufacturing. Some examples of the techniques described herein may be performed with Stereolithography (SLA), Multi Jet Fusion (MJF), Selective Laser Sintering (SLS), Digital Light Processing (DLP), Fused Deposition Modeling (FDM), Selective Laser Melting (SLM), etc. Some examples of the approaches described herein may be applied to additive manufacturing where agents carried by droplets are utilized for voxel-level thermal modulation.

Some examples of manufacturing may utilize a packing. A packing is information that specifies a positioning of an object or objects in a volume. A positioning is a position(s), location(s), and/or orientation(s), etc., of an object or objects.

A build volume is a volume that may be used for manufacturing. In some examples, a build volume may correspond to a physical space in which additive manufacturing may be performed. In some examples, a volume, build volume, or volume subset may be structured as a 3D space bounded by a polyhedron (e.g., a set of vertices, edges, and faces) that specifies the packing space scope. For example, a cuboidal space may be defined by 8 vertices (e.g., V={v1=(0,0,0), v2=(0,20,0), v3=(20,0,0), v4=(20,20,0), v5=(0,0,80), v6=(0,20,80), v7=(20,0,80), v8=(20,20,80)}), 12 edges (e.g., E={e1=(v1,v2), e2=(v1,v3), e3=(v1,v5), e4=(v2,v4), e5=(v2,v6), e6=(v3,v4), e7=(v3,v7), e8=(v4,v8), e9=(v5,v6), e10=(v5,v7), e11=(v6,v8), e12=(v7,v8)}), and 6 faces (e.g., F={f1={e1,e7,e10,e3}, f2={e6,e8,e12,e7}, f3={e8,e11,e5,e4}, f4={e2,e5,e9,e3}, f5={e1,e6,e4,e2}, f6={e10,e12,e11,e9}}). Different vertices, edges, and/or faces (and/or quantities thereof) may be utilized in some examples. In some examples, a build volume (e.g., packing space) may be a cuboidal space with x, y, and z dimensions. For example, a build volume may be a cuboid with dimensions of 284 millimeters (mm) in the x axis by 380 mm in the y axis by 380 mm in the z axis. It may be helpful to increase packing density in a build volume to increase production and/or reduce manufacturing costs.

In some examples, object packing may be based on an objective or objectives. An example of an objective is packing density (e.g., increasing or maximizing packing density). Object packing questions may be computationally intensive to solve, being nondeterministic polynomial- (NP-) complete. For example, computational complexity may grow exponentially in NP-complete questions. For instance, the size of the solution space (e.g., quantity of possible packings) for placement of objects (without rotation, for example) in a relatively small batch of 20 objects, is beyond the order of $1 \times 10^{18}$.

In some approaches, a voxel representation of a 3D object model includes surface voxels and inner voxels. A surface voxel is a voxel corresponding to a boundary of the geometry. An inner voxel is a voxel corresponding to an object interior. In some examples, a quantity of inner voxels may be significantly higher than a quantity of surface voxels for an object. For instance, a quantity of surface voxels may be proportional to an area of an object ($N^2$), while a quantity of inner voxels may be proportional to a volume of an object ($N^3$). Some voxel representations (e.g., octrees) may describe surface voxels and inner voxels explicitly. For instance, some voxel representations may consume a relatively large amount of data (in memory and/or on a disk, for example) and/or may consume a relatively large amount of processing time.

Some examples of the techniques described herein include voxel encoding techniques. For instance, voxel encoding techniques may be utilized in packing a build volume. Some examples of the voxel encoding techniques may increase performance (e.g., processing performance, processing efficiency, memory efficiency, etc.) in packing. For instance, voxel encoding may provide a more compact data representation and/or smaller memory footprint. Reducing data size and/or memory consumption may enhance processing for objects (e.g., large objects such as molded fiber screens).

Throughout the drawings, identical or similar reference numbers may or may not designate similar and/or identical elements. When an element is referred to without a reference number, this may refer to the element generally, without limitation to any particular drawing or figure. The drawings may or may not be to scale, and the size of some parts may be exaggerated to more clearly illustrate the example shown. Moreover, the drawings provide examples in accordance with the description. However, the description is not limited to the examples provided in the drawings.

Figure 1:
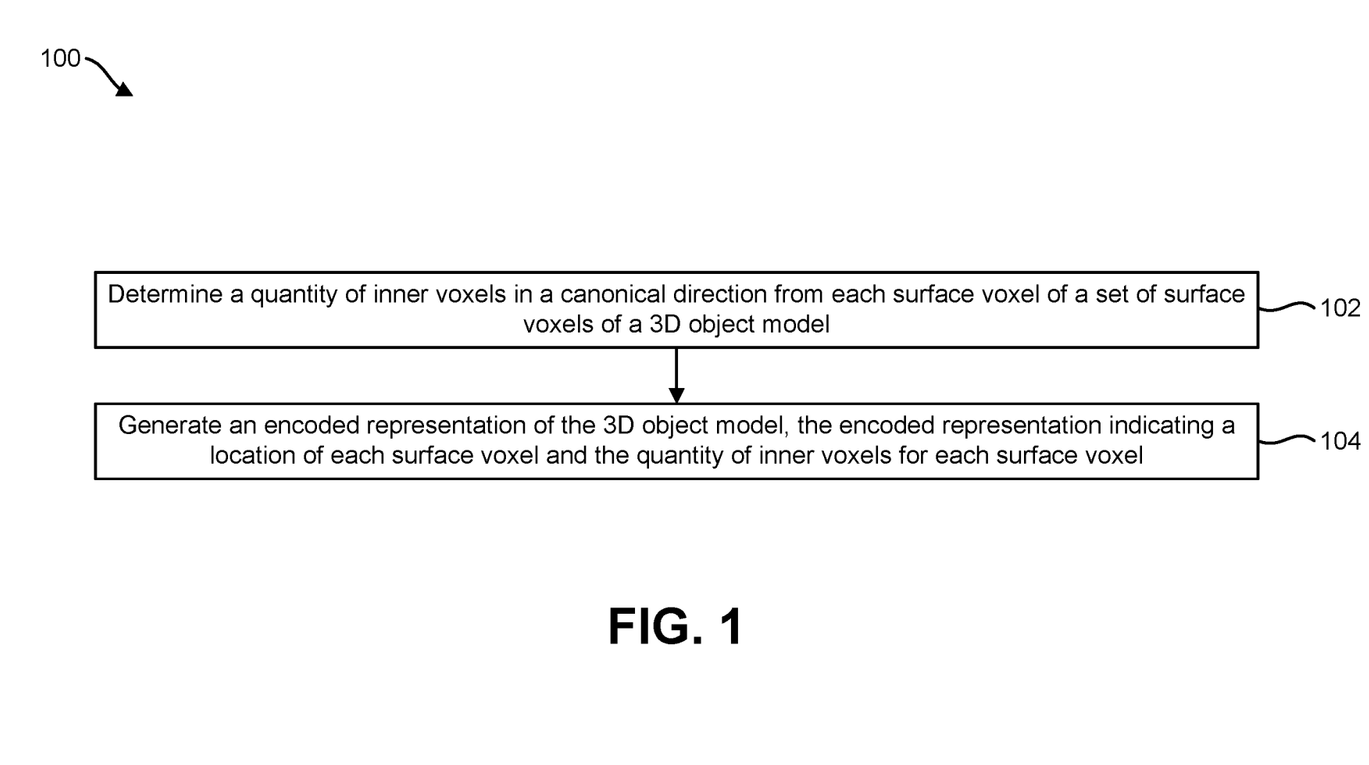
FIG. 1 is a flow diagram illustrating an example of a method for object model encoding.

FIG. 1 is a flow diagram illustrating an example of a method 100 for object model encoding. The method 100 and/or a method 100 element or elements may be performed by an apparatus (e.g., electronic device). For example, the method 100 may be performed by the apparatus 202 described in relation to FIG. 2.

In some examples, an apparatus may voxelize a mesh model to produce a set of surface voxels. A mesh model may be an example of a 3D object model and/or may be a representation of a 3D object model. For instance, A mesh model (or volumetric mesh) may be a collection of polygons (e.g., triangles, vertices, edges, faces, etc.) indicating the shape of a polyhedral object. In some examples, a volumetric mesh explicitly represents a surface and volume of a 3D object. In some examples, voxelizing the mesh model may include determining whether a surface of the mesh model intersects with a voxel. For instance, the apparatus may determine whether a surface of the mesh (e.g., polygon, triangle, vertex, edge, face, or a portion thereof) is within a voxel volume or intersects a voxel volume. In some examples, the apparatus may perform a pairwise comparison between each voxel and the mesh model. For instance, the apparatus may determine whether a portion of the mesh model (e.g., vertex, edge, face) is within a voxel volume (e.g., coordinate ranges). In a case that a portion of the mesh model is within the voxel volume, the apparatus may set a voxel to indicate that the voxel is a surface voxel (e.g., occupied by a portion of the mesh model) and/or may group the value into a set of surface voxels. In a case that no portion of the mesh model is within the voxel volume, the value may indicate (e.g., may be set to indicate or may be maintained to indicate) that the voxel is a non-surface voxel.

An apparatus may determine 102 a quantity of inner voxels in a canonical direction from each surface voxel of a set of surface voxels of a 3D object model. For instance, the apparatus may determine a quantity of voxels in the interior of the 3D object model (e.g., between surface voxels) in a canonical direction from a surface voxel for each of the surface voxels.

In some examples, determining a first quantity of inner voxels for a first surface voxel may include determining that a second surface voxel lies in the canonical direction from the first surface voxel. For instance, the apparatus may determine whether a voxel in the canonical direction from the first surface voxel includes a value indicating that the voxel is a surface voxel or is in a set of surface voxels. In some examples, the apparatus may determine that a second surface voxel is in the canonical direction by determining that a voxel in a set of surface voxels has two coordinate values that are the same as two coordinate values of the first surface voxel and that another coordinate value of the voxel is in the canonical direction. For a canonical direction to the right, for instance, the apparatus may determine that a voxel in a set of surface voxels has an x coordinate that is greater than an x coordinate of the first surface voxel, and that the voxel has y and z coordinates that are the same as y and z coordinates of the first surface voxel, which may indicate that the voxel is a second surface voxel that lies in the canonical direction to the right from the first surface voxel. In a case that multiple surface voxels lie in the canonical direction, the apparatus may select a closest surface voxel to the first surface voxel (e.g., a surface voxel with a smallest coordinate difference along the canonical direction) as the second voxel.

In some examples, determining the first quantity of inner voxels for the first surface voxel may include determining whether a non-surface voxel between the first surface voxel and the second surface voxel is an inner voxel. For instance, the apparatus may determine whether there is a non-surface voxel between the first surface voxel and the second surface voxel. If the second surface voxel neighbors the first surface voxel, or if there is no non-surface voxel between the first surface voxel and the second surface voxel, the apparatus may determine that there is no inner voxel(s) between the first surface voxel and the second surface voxel. In a case that a non-surface voxel is situated between the first surface voxel and the second surface voxel (e.g., there is a voxel between the first surface voxel and the second surface voxel that is not in the set of surface voxels), the apparatus may determine whether the non-surface voxel is an inner voxel. For instance, the apparatus may select a non-surface voxel (e.g., the nearest non-surface voxel, a non-surface voxel halfway between the first surface voxel and the second surface voxel, etc.) in the canonical direction from the first surface voxel and may test whether the selected non-surface voxel is an inner voxel.

In some examples, the apparatus may test a non-surface voxel to determine whether the non-surface voxel is an inner voxel. For a 3D object model (e.g., mesh model and/or voxel model), for instance, a non-surface voxel may be tested by extending a ray from the non-surface voxel and counting a quantity of intersections with a surface(s). For instance, the apparatus may infer whether the voxel (e.g., a point p or locations in 3D space) is inside or outside of the object by extending a ray in a direction (e.g., the canonical direction) from the voxel to a 3D space boundary (e.g., boundary of the build volume) and counting the quantity of intersections between the ray and a surface(s). The apparatus may determine that the non-surface voxel is an outer voxel (e.g., not an inner voxel) if the quantity of intersections is even. The apparatus may determine that the non-surface voxel is an inner voxel if the quantity of intersections is odd. In some examples, if the non-surface voxel is an inner voxel, then all non-surface voxels between the first surface voxel and the second surface voxel may be inner voxels.

In some examples, determining the first quantity of inner voxels for the first surface voxel may include calculating the first quantity of inner voxels in response to determining that the non-surface voxel is an inner voxel. In some examples, calculating the first quantity of inner voxels may include determining a distance between the first surface voxel and the second surface voxel. For instance, the apparatus may determine a difference (e.g., subtraction) between a first centroid of the first surface voxel and a second centroid of the second surface voxel. For example, the apparatus may subtract a first x coordinate of the first surface voxel from a second x coordinate of the second surface voxel for a canonical direction to the right.

In some examples, calculating the first quantity of inner voxels may include calculating the first quantity of inner voxels based on the distance and a voxel size. For instance, the apparatus may divide the distance by a dimension of the voxel size along the canonical direction. In some examples, calculating the first quantity of inner voxels may be performed in accordance with Equation (1).

$$\text{Voxels}_{Inner} = \left(\frac{\text{Distance}(c_1, c_2)}{\text{Size}_{Voxel}}\right) - 1 \quad (1)$$

In Equation (1), $\text{Voxels}_{Inner}$ is the quantity of inner voxels, Distance( ) is a function to calculate a distance between points, $c_1$ is a first centroid of the first surface voxel, $c_2$ is a second centroid of the second surface voxel, and $\text{Size}_{Voxel}$ is the voxel size (e.g., dimension) along the canonical direction.

The apparatus may generate 104 an encoded representation of the 3D object model. The encoded representation may indicate a location of each surface voxel and the quantity of inner voxels for each surface voxel. For instance, generating 104 the encoded representation may include associating a quantity of inner voxels with each surface voxel in the set of surface voxels. In some examples, generating 104 the encoded representation may include storing the quantity of inner voxels for each surface voxel with the location (e.g., x, y, and z coordinates) in a data structure (e.g., table, list, vector, array, etc.). For instance, Table (1) illustrates an example of the encoded representation.

TABLE 1

| x | y | z | inner_right |
|---|---|---|---|
| 2000 | 26000 | 26000 | 11 |
| 2000 | 22000 | 26000 | 11 |
| 2000 | 26000 | 22000 | 11 |
| 2000 | 22000 | 22000 | 11 |
| 2000 | 34000 | 26000 | 10 |
| 2000 | 14000 | 26000 | 10 |
| 2000 | 30000 | 26000 | 10 |
| 2000 | 18000 | 26000 | 10 |
| 2000 | 26000 | 30000 | 10 |
| 2000 | 22000 | 30000 | 10 |
| 2000 | 18000 | 30000 | 10 |
| 2000 | 30000 | 30000 | 10 |
| 2000 | 18000 | 22000 | 10 |
| 2000 | 14000 | 22000 | 10 |
| 2000 | 30000 | 22000 | 10 |

In Table (1), x is an x dimension coordinate of a surface voxel centroid, y is a y dimension coordinate of a surface voxel centroid, z is a z dimension coordinate of a surface voxel centroid, and inner_right is a quantity of inner voxels in a right canonical direction from a surface voxel. For instance, Table (1) may provide an example of an in-memory structure and/or an output file format listing surface voxel centroids and quantities of inner voxels in a right canonical direction from each of the surface voxels.

In some examples, the apparatus may determine 102 a quantity of inner voxels for multiple canonical directions and/or may generate 104 an encoded representation for the multiple canonical directions. For instance, the apparatus may iterate over the surface voxels to produce multiple (e.g., two, three, four, five, or six) quantities of inner voxels for each surface voxel. In some examples, generating an encoded representation for multiple canonical directions (e.g., two canonical directions or more canonical directions) may provide redundant information. For instance, generating an encoded representation with one canonical direction for the surface voxels may represent a complete object.

In some examples, generating an encoded representation for multiple canonical directions may be utilized for error checking. For instance, the apparatus may decode the encoded representation for multiple canonical directions to produce decoded representations based on multiple canonical directions. The apparatus may compare the decoded representations. In a case that the decoded representations do not match, the apparatus may detect an encoding error and/or other data error (e.g., error from transmitting and/or receiving the encoded representation(s)). In a case that an error is detected, the apparatus may re-encode the 3D object model and/or may re-transmit another encoded representation(s) to another device. For instance, the apparatus may generate an encoded representation(s) and send the encoded representation(s) to a remote device (over a network, such as the Internet, for example).

In some examples, the method 100 may include determining a packing based on the encoded representation. For instance, the apparatus may utilize the encoded representation to determine a packing of a build volume that includes the 3D object model indicated by the encoded representation. In some examples, determining the packing may include placing the encoded representation (e.g., the 3D object model represented by the encoded representation) in a build volume with varying rotations and/or translations to determine a placement of the 3D object model in the build volume (with another 3D object model(s), for instance).

In some examples, determining the packing may include rotating the encoded representation. While packing, for instance, the apparatus may maintain in memory the encoded representation(s) of multiple voxelated 3D object models (with inner voxels encoded) to propose multiple potential positionings. Potential positionings may be determined by applying 90° rotations in the x, y, and z axes. In some examples, rotating the encoded representation may be constrained to 0°, 90°, 180°, and 270° rotations (e.g., 90° rotation multiples). In some examples, an encoded representation rotation (of the surface voxels, for instance) may include changing voxel centroid coordinates and switching inner voxel quantity directions (without additional rotation operations on the inner voxels, for instance). For instance, the apparatus may reassign a canonical direction of the encoded representation to a different canonical direction to rotate the encoded representation.

In some examples, rotating the encoded representation(s) may allow efficiently transforming voxels of an object, without explicitly performing rotations on inner voxels. For instance, geometrical rotations may be performed on the surface voxels without performing a geometrical rotation on the inner voxels. In some examples, geometrical translations may be performed on the surface voxels without performing a geometrical translation of the inner voxels. Rotating and/or translating the surface voxels of the encoded representation may allow object positioning with a computational workload of $N^2$ (e.g., a workload proportional to a surface voxel quantity) rather than $N^3$ (e.g., a workload proportional to a quantity of all voxels of a 3D object model).

During packing, when a voxelated object (with a potential positioning) is introduced into the build volume, the object (e.g., encoded representation) may be is translated across x, y, and/or z dimensions in an attempt to determine a location in the packing. In some examples, determining the packing may include decoding the encoded representation to produce a decoded representation and/or performing collision detection based on the decoded representation. A decoded representation is a representation that explicitly indicates each voxel (e.g., surface voxels and inner voxels). For instance, a decoded representation may include data discretely indicating the location of each voxel. In some examples, a decoded representation may be formatted as an octree and/or a bounding volume hierarchy (BVH) representation. In some examples, decoding and/or collision detection may be performed iteratively. For instance, decoding and/or collision detection may be performed at each iteration of a placement procedure or at selected iterations of a placement procedure. In some examples, translations may be iteratively performed until a collision is detected. In some examples, the placement of the object (for a dimension or dimensions, for instance) may be selected as a previous (e.g., last) iteration before the iteration in which a collision is detected.

In some examples, to check whether two objects collide, the encoded representation may be decoded into a decoded (e.g., explicit) representation. In some examples, the decoded representation may be utilized to execute a BVH query (e.g., collision detection technique based on unit voxel collision). A BVH is a tree structure representing a geometric object(s). For instance, a geometric object(s) may be wrapped in bounding volumes that form the leaf nodes of the tree. In a case of voxelated objects, BVH and octrees may be structured similarly. For instance, a voxelated object may be represented as a hierarchy of axis-aligned bounding boxes, where BVH leaves correspond to the voxels. In some examples, the apparatus may perform a collision detection between two objects by iteratively traversing both BVH representations to determine whether an intersection between two bounding volumes exists. A collision may be detected based on whether an overlap occurs between two voxels or not. In some examples, the decoded representation may be stored in an octree fashioned structure, where voxels may be structured in a hierarchical scheme. Collision detection on two decoded representations may be performed by traversing the branches from the octree following intersection subsets. If two leaves from the octrees collide, then a collision detection routine may return an indication of the collision. In some examples, in a case that a collision is detected, a previous placement may be utilized as a placement (for a dimension or dimensions, for instance) of the object in a packing.

In some examples, the apparatus may pack a build volume using a genetic procedure. For instance, the genetic procedure may pack the build volume using an encoded representation(s) of a 3D object or objects. A genetic procedure is a computational procedure. For example, a genetic procedure may be a metaheuristic procedure that includes evolution and/or selection mechanisms for determining a solution. In some examples, a genetic procedure may be a technique utilized in artificial intelligence. In some examples, the genetic procedure may include initializing a population, evaluation, selection, crossover, and/or mutation operations. In some examples, evaluation, selection, crossover, and/or mutation may be performed repeatedly (e.g., iteratively, recursively, etc.) until an end condition is met. In some examples, determining a packing based on the encoded representation(s) may be performed in initializing a population, crossover, and/or mutation operations. A population is a group or set of chromosomes. In some examples, the apparatus may perform a genetic procedure using a chromosome or chromosomes.

A chromosome is data. For example, a chromosome may include data representing a potential solution for a question that the genetic procedure is to address. A chromosome may include and/or represent a set of objects. In some examples, a chromosome may include data indicating a set of object identifiers and poses. An object identifier is information (e.g., number, floating point number, integer, string, character(s), name, etc.) that identifies an object. A pose is information indicating a location and/or orientation of an object. For instance, a pose may indicate a location (e.g., translation) of an object in a build volume and/or an orientation (e.g., rotation(s) in a dimension or dimensions) of an object in a build volume. For instance, a pose may indicate a location and/or orientation of an encoded representation of an object. In some examples, a pose may be expressed as a number or numbers (e.g., floating point numbers, integers, etc.), vector(s), matrix or matrices, quaternion(s), etc. In some examples, a chromosome may include an object identifier with a first axis (e.g., x) rotation, a second axis (e.g., y) rotation, and a third axis (e.g., z) rotation for each of a set of objects. In some examples, a gene of a chromosome may represent an object. In some examples, a chromosome may include an object identifier with an orientation (and without location, for instance) for each of a set of objects. In some examples, each gene of a chromosome may include an object identifier and/or pose (e.g., orientation and/or location).

In some examples, a chromosome may include data for each object in an order or sequence. In some examples, the order or sequence of a chromosome may correspond to a packing order in a build volume. For instance, the apparatus may place the objects of a chromosome in the build volume in the order or sequence indicated in the chromosome. In some cases, consecutive objects in a chromosome may be placed adjacently in the volume if volume dimensions allow, to an extent that volume dimensions allow, and/or to an extent that previously-placed object(s) allow. In some examples, the order or sequence may establish a queue. For instance, the order or sequence may indicate an order that objects may be introduced into a build volume. In some examples, a chromosome may include an object identifier and rotations for respective objects from object 1 to object n. For instance, a chromosome may encode an object list (e.g., list of genes), where each element of the list indicates an identifier of an object and/or rotation angles corresponding to axes (e.g., in x, y, and/or z axes). In some examples, the order or sequence of a chromosome may be an order or sequence of object identifiers. In some examples, each chromosome may represent a potential packing described as a sequence of object identifiers with associated poses. For instance, a chromosome may indicate a packing order of objects in a build volume. A packing is an organization of objects. For instance, a chromosome may indicate an object attention queue or sequence, and a placement procedure may locate the objects in a build volume in the chromosome order.

In initializing a population, the apparatus may randomly initialize a set of chromosomes and/or portions of chromosomes. For example, the apparatus may utilize a random number generator to generate random poses for a set of objects to be packed in the build volume. In some examples, the poses may be constrained to multiples of 90° (e.g., 0°, 90°, 180°, 270°, etc.). In some examples, the initialized set of chromosomes and/or portions of chromosomes may include sequences of object identifiers and poses.

In some examples, packing a build volume may be processed using chromosomes in a genetic procedure instance. A genetic procedure instance is the performance of a genetic procedure to an end condition (e.g., multiple iterations are performed until an end condition is reached) for objects (e.g., encoded representations). For example, a genetic procedure instance for the objects may be performed until an end condition is reached for the objects. Mutations may modify object orientations and/or an object sequence inside a chromosome or chromosomes. In some approaches, the genetic procedure may proceed (e.g., evaluation may be) based on chromosome fitness.

In performing evaluation, the apparatus may evaluate and/or rank the chromosomes according to a value or values. Examples of values include fitness scores. A fitness score is a measure, metric, or score that indicates a degree to which a chromosome (e.g., packing) satisfies an objective or objectives (e.g., increased packing density, decreased packing height, and/or decreased z-axis measure, etc.). For example, the fitness score may be evaluated for each chromosome (e.g., packing). Examples of fitness scores may include quantity of objects packed, packing density, and/or packing height (e.g., z-height). The quantity of objects packed is a quantity of objects that fit within a build volume for a chromosome. A quantity of objects packed may be determined for each chromosome.

In some examples, a value or values (e.g., fitness score, quantity of objects packed, packing density, and/or packing height, etc.) may be utilized to rank or order chromosomes. In some examples, a group of values (e.g., fitness score, quantity of objects packed, packing density, and/or packing height, etc.) may be assembled and/or combined to form a packing score that can be utilized to rank one packing over another packing. For instance, a packing score may be determined based on a function, combination, mapping, weighted sum, average, etc., of multiple values (e.g., fitness score, quantity of objects packed, packing density, and/or packing height, etc.). In some examples, chromosomes with a relatively greater packing density, a relatively greater quantity of objects packed, and/or a relatively lesser packing height may be ranked higher than other chromosomes.

In some examples, the value(s) (e.g., fitness score(s), packed quantity(ies), packing density(ies), and/or packing height(s), etc.) may be determined based on a placement procedure. An example of a placement procedure is a bottom-front-left placement procedure. For instance, the objects of a chromosome may be placed in a build volume in accordance with the placement procedure to produce a packing. The value(s) (e.g., fitness score(s), packed quantity(ies), packing density(ies), and/or packing height(s), etc.) may be determined (e.g., calculated, computed, etc.) based on the packing.

In some examples, a bottom-front-left placement procedure may utilize the object sequence of a chromosome to enter each object in sequence (e.g., one after another in the given order). The bottom-front-left placement procedure (e.g., heuristic) may enter an object from a top-back-right corner of a volume (e.g., first portion, second portion, build volume subset, and/or build volume, etc.), and move (e.g., incrementally move, continuously move, etc.) the object downward (e.g., along a z axis) until contacting with (or colliding with or coming within a distance from) another object or contacting with (or colliding with or coming within a distance from) a volume (e.g., first portion, second portion, build volume subset, and/or build volume, etc.) frontier (e.g., edge, boundary, face, etc.). Examples of the distance may include 0.01 mm, 0.1 mm, 0.5 mm, 1 mm, 2 mm, 5 mm, etc. The object may then be moved from a back of the build volume frontward (e.g., along a y axis) until contacting with (or colliding with or coming within a distance from) another object or contacting with (or colliding with or coming within a distance from) a build volume frontier. For instance, the encoded representation may be decoded to produce a decoded representation (e.g., BVH representation, octree, etc.), which may be utilized to perform collision detection as described herein. The object may then be moved from a right side of the build volume (or volume subset) leftward (e.g., along an x axis) until contacting with (or colliding with or coming within a distance from) another object or contacting with (or colliding with or coming within a distance from) a build volume frontier. Other placement procedures may be utilized in some examples. For instance, other placement procedures that place the objects of the chromosome(s) proceeding in different directions may be utilized in some examples.

In performing selection, the apparatus may eliminate a quantity of the chromosomes. For instance, the apparatus may eliminate (e.g., discard, delete, remove, exclude, etc.) a quantity of the lowest ranked chromosomes (e.g., a percentage of lowest ranked chromosomes, a quantity of lowest ranked chromosomes, etc.). In some examples, the chromosomes may be categorized based on rank. For example, a first quantity (e.g., percentage of chromosomes, quantity of chromosomes, etc.) of the chromosomes may be categorized in a first category. For instance, the first quantity may be a set of highest ranked chromosomes. The first quantity of chromosomes may be referred to as elite chromosomes (e.g., a quantity of chromosomes with best fitness scores, quantities of objects packed, packing height, and/or packing density). In some examples, a gene or genes (e.g., object identifier(s) and/or pose(s)) of the elite chromosomes may be preserved and/or propagated to a subsequent (e.g., next) generation of chromosomes. A generation is a set of chromosomes (e.g., packings). For example, a generation may correspond to each iteration of the genetic procedure.

In some examples, selection may include chromosome selection for propagation (e.g., mutation and/or crossover) and/or packing (e.g., selecting a chromosome for a packing solution). For instance, the apparatus may select a chromosome or chromosomes based on a rank that is based on fitness scores, quantities of objects packed, packing density, and/or packing height, etc.

In some examples, selecting a chromosome may be based on a value or values. In some examples, selecting a chromosome for propagation is based on a fitness score. For example, a chromosome or chromosomes with better (e.g., a set of top) fitness scores may be selected for propagation and/or packing. For instance, selecting a chromosome for propagation may be based on a quantity of objects packed. For instance, chromosomes with higher quantities of objects packed, higher packing density, and/or lower packing height may be selected for propagation and/or packing. In some examples, first portions of chromosomes corresponding to the first object(s) may be propagated without modification to a subsequent generation or generations. In some examples, the chromosomes may not include portions corresponding to the first object(s).

In performing crossover, the apparatus may utilize a second quantity of the chromosomes and elite chromosomes. The second quantity of the chromosomes may be referred to as crossover chromosomes. The second quantity of chromosomes may be ranked below the elite chromosomes. For instance, the apparatus may randomly select chromosomes that are ranked below the elite chromosomes to select the crossover chromosomes. The apparatus may crossover the crossover chromosomes with the elite chromosomes. For example, the apparatus may combine a part or parts (e.g., gene(s), object identifier(s), pose(s), location(s), orientation(s), rotation(s), and/or sequence position(s)) of an elite chromosome with a part or parts (e.g., gene(s), object identifier(s), pose(s), location(s), orientation(s), rotation(s), and/or sequence position(s)) of a crossover chromosome to generate a child chromosome in a subsequent (e.g., next) generation of chromosomes.

In performing mutation, the apparatus may randomly mutate an elite chromosome or elite chromosomes. For example, the apparatus may randomly change a gene or genes (e.g., object identifier(s), pose(s), location(s), orientation(s), rotation(s), and/or sequence position(s)) of an elite chromosome or elite chromosomes. For instance, the apparatus may randomly change a pose (which may be constrained to multiples of 90°, for instance). The chromosomes to be mutated may be referred to as mutation chromosomes.

In some examples, a constant population size (e.g., quantity of chromosomes) may be maintained over generations. In some examples, the population size may vary over generations. In some examples, new random chromosomes may be added. For instance, a set of randomly generated chromosomes may be added to the elite chromosomes, crossover chromosomes, and mutation chromosomes. For instance, adding new random chromosomes may maintain the constant population size. The random chromosomes may be useful for driving a random search in different directions in the solution space. In some approaches, mutations of chromosomes may be represented as random movements in the object sequence and/or random rotations on the object orientations. The mutation stage may be utilized to mutate elite chromosomes (e.g., good solutions) into chromosomes with increased fitness (e.g., better solutions). Performing selection, crossover, and/or mutation may produce a subsequent generation of chromosomes.

In some examples, an operation or operations of the genetic procedure may repeat (e.g., iterate, recur, etc.). For example, evaluation, crossover, and/or mutation may be repeated for subsequent generations of chromosomes until an end condition is met (e.g., a threshold quantity of generations, a threshold quantity of packed objects, a threshold fitness score, and/or a threshold packing score, etc.).

In some examples, the method 100 may include caching the encoded representation. For instance, the apparatus may generate 104 the encoded representation. The apparatus may cache the encoded representation in memory. For example, when an object to be packed is voxelized and/or encoded, the apparatus may cache the encoded representation to disk for packing purposes. For instance, caching the encoded representation may include storing (e.g., writing) surface voxel information and inner voxel counts, which may enable a reduction in a quantity of read and/or write operations. The speed of loading may be increased when the cached encoded representation is loaded. The apparatus may load the cached encoded representation from the memory to pack the build volume.

In some examples, the method 100 may include selecting a packing. For example, the method 100 may include selecting a packing based on a fitness score (e.g., ranking, value(s), packing score, packing density, packing height, etc.). In some examples, the method 100 may include determining the fitness score based on a placement procedure. For example, the apparatus may use the placement procedure described above to evaluate a fitness score for each chromosome resulting from the genetic procedure. In some examples, selecting the packing is based on the genetic procedure with an objective. For instance, the apparatus may select a chromosome that represents a packing with a highest ranking, best value(s), best packing score, maximum quantity of packed objects, best fitness score, maximum packing density, and/or minimum height, etc. In some examples, the apparatus may select the packing based on an objective (e.g., packing density, quantity of packed objects, packing height, and/or fitness, etc.) or a combination of objectives. For instance, a packing with a best combination of objectives, such as quantity of packed objects, packing density, packing height, and/or fitness score, may be selected. In some examples, the method 100 may include selecting a build volume packing (e.g., a packing for an entire build volume that best meets an objective or combination of objectives).

In some examples, a packing(s) may be executed to manufacture the objects. For example, the objects may be manufactured by an apparatus (e.g., 3D printer) in accordance with the selected packing(s). For instance, an apparatus may send the packing(s) (e.g., build volume packing) to another device (e.g., 3D printer) or may execute the packing(s) to manufacture the objects in the packing(s). Some examples of the techniques described herein may be utilized in a variety of additive manufacturing. Some additive manufacturing techniques may be powder-based and driven by powder fusion. Some additive manufacturing techniques may include metal printing, such as metal jet fusion. Some examples of the approaches described herein may be utilized in powder bed fusion-based additive manufacturing.

In some examples, the method 100 may include presenting the selected packing(s). For instance, the apparatus may send an image(s) of the packing(s) to a display for presentation. In some examples, the method 100 may include sending the selected packing(s) to another device (e.g., computing device, server, etc.). For instance, the apparatus may transmit the selected packing(s) to another device via a network (e.g., a local area network, the Internet, etc.).

Figure 2:
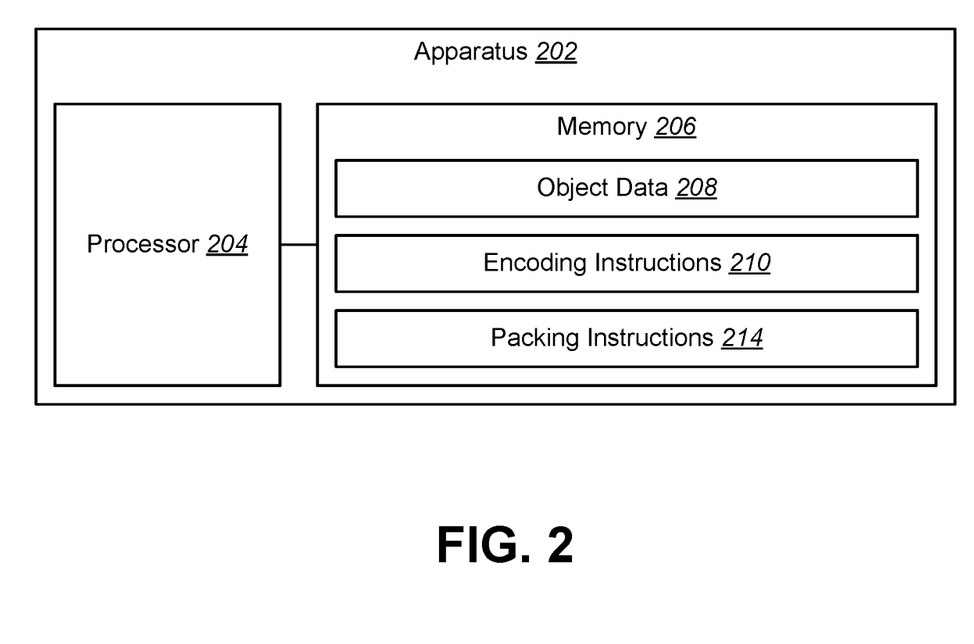
FIG. 2 is a block diagram of an example of an apparatus that may be used in object model encoding.

FIG. 2 is a block diagram of an example of an apparatus 202 that may be used in object model encoding. The apparatus 202 may be an electronic device, such as a personal computer, a server computer, a printer, a 3D printer, a smartphone, a tablet computer, etc. The apparatus 202 may include and/or may be coupled to a processor 204 and/or a memory 206. In some examples, the apparatus 202 may be in communication with (e.g., coupled to, have a communication link with) an additive manufacturing device (e.g., a 3D printing device). In some examples, the apparatus 202 may be an example of a 3D printing device. The apparatus 202 may include additional components (not shown) and/or some of the components described herein may be removed and/or modified without departing from the scope of the techniques described herein.

The processor 204 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 206. The processor 204 may fetch, decode, and/or execute instructions (e.g., encoding instructions 210 and/or packing instructions 214) stored in the memory 206. In some examples, the processor 204 may include an electronic circuit or circuits that include electronic components for performing a function or functions of the instructions (e.g., encoding instructions 210 and/or packing instructions 214). In some examples, the processor 204 may perform one, some, or all of the functions, operations, elements, methods, etc., described in relation to one, some, or all of FIGS. 1-6.

The memory 206 may be any electronic, magnetic, optical, or other physical storage device that contains or stores electronic information (e.g., executable instructions, executable code, and/or data). The memory 206 may be, for example, Random Access Memory (RAM), Electrically Erasable Programmable Read-Only Memory (EEPROM), a storage device, an optical disc, and the like. In some examples, the memory 206 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the memory 206 may be a non-transitory tangible machine-readable (e.g., computer-readable) storage medium, where the term "non-transitory" does not encompass transitory propagating signals. In some examples, the memory 206 may include multiple devices (e.g., a RAM card and a solid-state drive (SSD)).

In some examples, the apparatus 202 may include a communication interface (not shown in FIG. 2) through which the processor 204 may communicate with an external device or devices (not shown), for instance, to receive and store information (e.g., object data 208) pertaining to an object or objects to be encoded and/or manufactured (e.g., printed). The communication interface may include hardware and/or machine-readable instructions to enable the processor 204 to communicate with the external device or devices. The communication interface may enable a wired and/or wireless connection(s) to the external device or devices. The communication interface may further include a network interface card and/or may also include hardware and/or machine-readable instructions to enable the processor 204 to communicate with various input and/or output devices, such as a keyboard, a mouse, a display, another apparatus, electronic device, computing device, etc. In some examples, the apparatus 202 may receive instructions via an input device from a user.

In some examples, the memory 206 may store object data 208. The object data 208 may be obtained (e.g., received) from an external device and/or may be generated on the apparatus 202. For example, the processor 204 may execute instructions (not shown in FIG. 2) to receive the object data 208 from an external device.

The object data 208 may include data indicating objects and/or shapes (e.g., 3D models, dimensions, mesh models, voxels, etc.) of objects. For example, the object data 208 may indicate objects for encoding, packing, and/or manufacture.

In some examples, the processor 204 may execute encoding instructions 210 to generate an encoded representation of a 3D object model, the encoded representation indicating surface voxel locations and inner voxel quantities. In some examples, generating an encoded representation of a 3D object model may be performed as described in relation to FIG. 1. For instance, the processor 204 may determine an inner voxel quantity for each surface voxel to generate the encoded representation. In some examples, the processor 204 may cache the encoded representation in the memory 206 (e.g., in the object data 208). In some examples, the processor 204 may load the cached encoded representation from the memory 206 to pack the build volume. In some examples, caching the encoded representation and/or loading the cached encoded representation may be performed as described in relation to FIG. 1 and/or FIG. 6.

In some examples, the processor 204 may execute the packing instructions 214 to pack a build volume based on the encoded representation. In some examples, packing the first objects in the first portion may be performed as described in relation to FIG. 1. For instance, the processor 204 may pack a build volume using a genetic procedure based on the encoded representation (e.g., encoded representations of 3D objects). For instance, the processor 204 may iteratively perform mutation, evaluation, and/or selection on the encoded representation(s) to pack the build volume.

In some examples, the apparatus 202 may perform manufacturing based on the packing. For example, the apparatus 202 may 3D print the packing and/or send the packing to a 3D printer for manufacturing.

Figure 3:
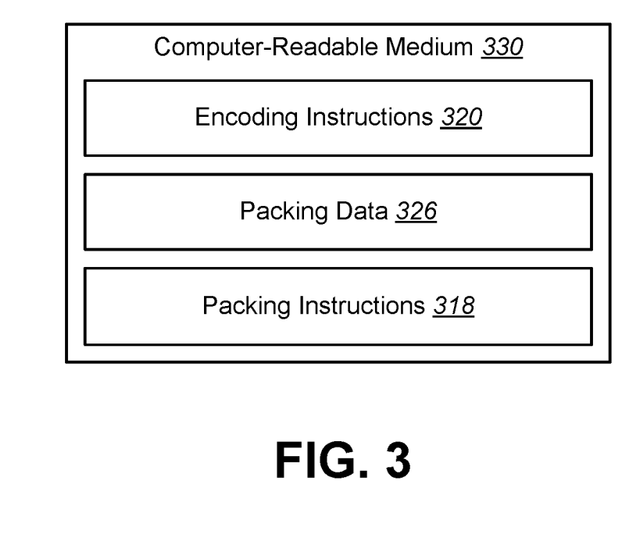
FIG. 3 is a block diagram illustrating an example of a computer-readable medium for performing object model encoding.

FIG. 3 is a block diagram illustrating an example of a computer-readable medium 330 for performing object model encoding. The computer-readable medium 330 is a non-transitory, tangible computer-readable medium 330. The computer-readable medium 330 may be, for example, RAM, EEPROM, a storage device, an optical disc, and the like. In some examples, the computer-readable medium 330 may be volatile and/or non-volatile memory, such as DRAM, EEPROM, MRAM, PCRAM, memristor, flash memory, and the like. In some examples, the memory 206 described in relation to FIG. 2 may be an example of the computer-readable medium 330 described in relation to FIG. 3.

The computer-readable medium 330 may include data (e.g., information and/or instructions). For example, the computer-readable medium 330 may include encoding instructions 320, packing data 326, and/or packing instructions 318. In some examples, the computer-readable medium 330 may include information and/or instructions to perform an operation or operations described in relation to FIG. 1, FIG. 2, FIG. 4, FIG. 5, and/or FIG. 6.

In some examples, the encoding instructions 320 are instructions, when executed, cause a processor of an electronic device to generate a first encoded representation of a 3D object model based on a first canonical direction. The first encoded representation may indicate a location of a surface voxel and a quantity of inner voxels in the first canonical direction from the surface voxel. In some examples, generating the first encoded representation may be performed as described in relation to FIG. 1 and/or FIG. 2.

In some examples, the processor may execute the encoding instructions 320 to generate a second encoded representation of the 3D object model based on a second canonical direction. For instance, the processor may generate a second encoded representation of surface voxels in a second canonical direction that is different from the first canonical direction. In some examples, generating the second encoded representation may be performed as described in relation to FIG. 1 and/or FIG. 2. In some examples, the processor may execute the encoding instructions 320 to error check the first encoded representation based on the second encoded representation. For instance, the processor may execute the encoding instructions 320 to decode the first encoded representation to produce a first decoded representation, to decode the second encoded representation to produce a second decoded representation, and to compare the first decoded representation and the second decoded representation to error check the first encoded representation. For instance, the first decoded representation (e.g., octree, BVH, etc.) and the second decoded representation may be compared. The processor may detect an error in a case that the first decoded representation and the second decoded representation do not match. In a case that an error is detected, the processor may encode the 3D object model again and may check the corresponding decoded representations again. In some examples, the processor may produce an alert (e.g., visual alert to be presented on a display, sound alert, email, text message, etc.) indicating the error. In some examples, the processor may suspend packing based on the encoded representation(s).

The packing data 326 may include information indicating a plurality of packings. For example, the packing data 326 may indicate a set of packings, a population of packings, and/or generations of packings. For instance, operations may be performed as described herein to determine a plurality of chromosomes that represent packings. The chromosomes may be stored as packing data 326. In some examples, the chromosomes may include and/or may be associated with an encoded representation(s).

In some examples, the packing instructions 318 are instructions, when executed, cause a processor of an electronic device to pack a build volume based on the first encoded representation. In some examples, packing the build volume may be performed as described in relation to FIG. 1 and/or FIG. 2. In some examples, the packing may be performed using a genetic procedure. For instance, the genetic procedure may be allowed to change (e.g., mutate) a pitch angle, a yaw angle, a roll angle, and/or an order of the objects in the chromosomes to determine a packing.

To determine a packing in some examples, packing scores may be compared. A packing score is a score indicating a value or a combination of values (e.g., quantity of objects packed, fitness score, packing height, and/or packing density, etc.). An example of packing selection is given as follows. Assume two packings A and B with corresponding packing scores s_A and s_B. In some examples, a packing score s_X may include parameters (e.g., k parameters or values): s_X={p1_X, p2_X, . . . , pk_X}, where px_X is a parameter or value. A quantity (e.g., k) of threshold values may be utilized: $\alpha, \beta, \ldots, \varphi$. If the first k−1 parameters of each packing are relatively closer to each other (up to an adjustable threshold), a Boolean value of (p1_A>p1_B) may indicate whether s_A is greater than s_B. For instance, in a case that abs(p1_A−p1_B)<$\alpha$ and abs(p2_A−p2_B)<$\beta$ and so on for the rest of the parameters, and (pk_A !=pk_B), then a Boolean value of (pk_A>pk_B) may indicate whether s_A is greater than s_B. Otherwise, a parameter number k−1 may be compared. For instance, in a case that abs(p1_A−p1_B)<a and abs(p2_A−p2_B)<B and so on for the rest of the parameters, and (pk-1_A !=pk-1_B), then a Boolean value of (pk-1_A>pk-1_B) may indicate whether s_A is greater than s_B. Otherwise, similar comparisons may be made for a parameter or parameters (e.g., pk-2_A !=pk-2_B and so on) until the final case, where (p1_A>p1_B) may indicate whether s_A is greater than s_B. The packing with the greatest score may be selected. In some examples, one parameter or multiple parameters (e.g., values) may be utilized in the comparison.

In some examples, the computer-readable medium 330 may include instructions, when executed, cause a processor to manufacture the packing(s). For example, the processor may execute instructions and/or send instructions to another device (e.g., 3D printer) to manufacture the packing(s).

Figure 4:
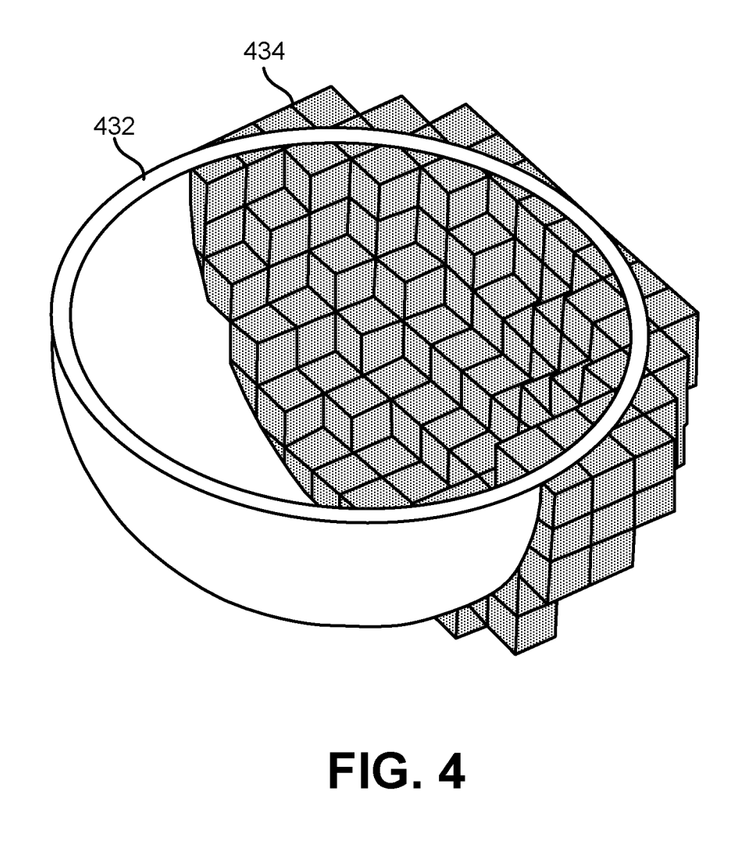
FIG. 4 is a diagram illustrating a perspective view of an example of a cross section of a mesh model and some surface voxels in accordance with some examples of the techniques described herein.

FIG. 4 is a diagram illustrating a perspective view of an example of a cross section of a mesh model 432 and some surface voxels 434 in accordance with some examples of the techniques described herein. In the example of FIG. 4, the surface voxels 434 are voxels that intersect the mesh model 432. For instance, the mesh model 432 may be voxelized to produce a set of surface voxels that includes the surface voxels 434 illustrated.

Figure 5:
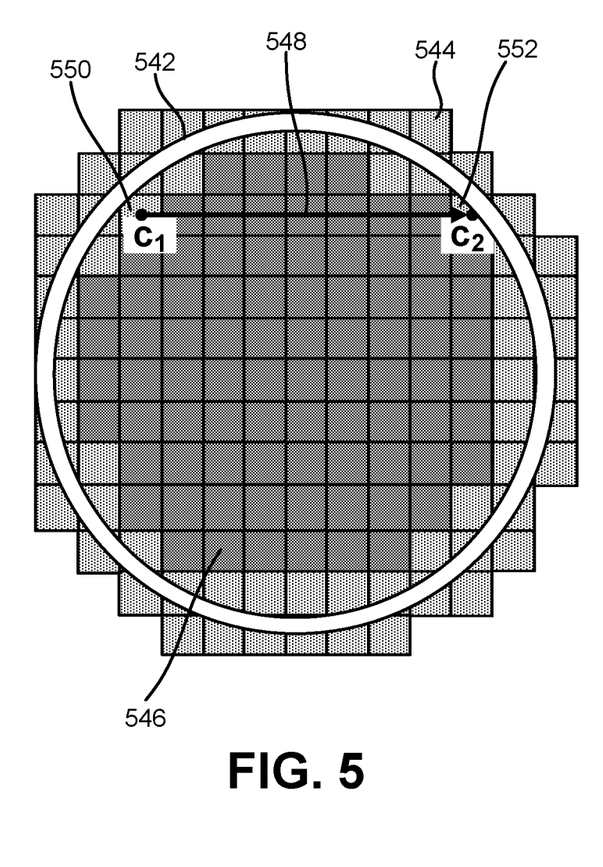
FIG. 5 is a diagram illustrating a top view of an example of cross section of a mesh model, some surface voxels, and some inner voxels in accordance with some examples of the techniques described herein.

FIG. 5 is a diagram illustrating a top view of an example of cross section of a mesh model 542, some surface voxels 544, and some inner voxels 546 in accordance with some examples of the techniques described herein. In this example, suppose a first surface voxel $v_1$ 550 is a surface voxel with first centroid $c_1$ and d is a canonical direction to the right. A quantity of the inner voxels 546 next to the first voxel $v_1$ 550 in the d-direction may be encoded without explicitly computing inner voxel 546 centroids.

In accordance with some of the examples described herein, a second surface voxel $v_2$ 552 (with centroid $c_2$) may be a closest surface voxel in the d-direction from the first voxel $v_1$ 550. An apparatus (e.g., the apparatus 202 described in relation to FIG. 2) may detect whether a voxel or voxels between the first voxel $v_1$ 550 and the second voxel $v_2$ 552 is an inner voxel(s). For instance, the detection may be performed by defining a point p (e.g., a centroid of a voxel) in between the first voxel $v_1$ 550 and the second voxel $v_2$ 552. A ray may be extended to the right of p. Because the ray intersects an odd quantity of surfaces (e.g., one surface) to the right of p, the voxel of p may be detected as an inner voxel.

In response to the inner voxel detection between the first voxel $v_1$ 550 and the second voxel $v_2$ 552, the apparatus may calculate the distance 548 from the first centroid $c_1$ to the second centroid $c_2$. In some examples, the quantity of inner voxels between the first voxel $v_1$ 550 and the second voxel $v_2$ 552 may be calculated based on the distance 548 and a voxel size in accordance with Equation (1). In this example, the first voxel $v_1$ 550 may be assigned a quantity of seven for the right canonical direction. In a case that a closest voxel in a d-direction from a voxel is not detected, the voxel may be a last surface voxel in the d-direction.

Figure 6:
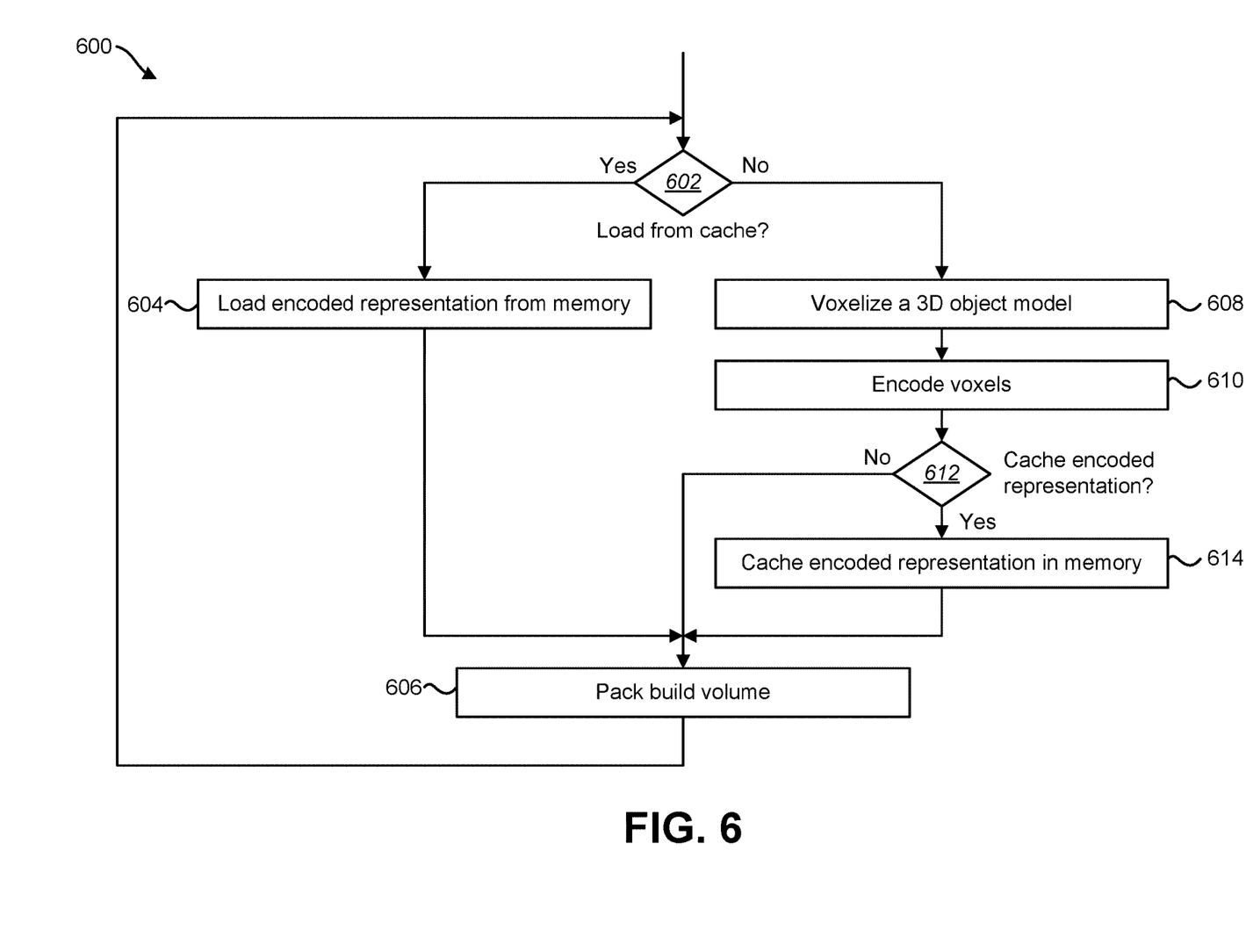
FIG. 6 is a flow diagram illustrating an example of a method for caching an encoded representation.

FIG. 6 is a flow diagram illustrating an example of a method 600 for caching an encoded representation. In some examples, the method 600 may be performed by an apparatus (e.g., the apparatus 202 described in relation to FIG. 2).

An apparatus may determine 602 whether to load an encoded representation from a cache. In some examples, determining 602 whether to load an encoded representation from a cache may be based on whether an encoded representation of a 3D object model is stored in memory. For instance, a call for a 3D object model may be executed by a processor. The processor may determine whether an encoded representation corresponding to the 3D object model is stored in memory.

In a case that the apparatus determines to load the encoded representation (e.g., if an encoded representation was previously stored in memory), the apparatus may load 604 the encoded representation from memory. For instance, the apparatus may fetch the encoded representation from memory. The apparatus may pack 606 a build volume based on the encoded representation. For instance, the apparatus may pack the build volume using the encoded representation and a genetic procedure.

In a case that the apparatus determines not to load the encoded representation (e.g., if an encoded representation is not stored in memory), the apparatus may voxelize 608 the 3D object model (e.g., mesh model). For instance, apparatus may determine a set of surface voxels from the 3D object model as described in relation to FIG. 1.

The apparatus may encode 610 voxels. In some examples, encoding 610 the voxels may be performed as described in relation to FIG. 1. For example, the apparatus may determine a quantity of inner voxels in a canonical direction from a surface voxel for each of the set of surface voxels. A quantity of inner voxels may be associated with a surface voxel for each surface voxel.

The apparatus may determine 612 whether to cache the encoded representation. For instance, the apparatus may determine to cache the encoded representation in a case that subsequent packing (e.g., another instance of a genetic procedure) may be performed using the encoded representation. In a case that is it determined not to cache the encoded representation, the apparatus may pack 606 a build volume using the encoded representation (without caching the encoded representation, for instance). In a case that it is determined to cache the encoded representation, the apparatus may cache 614 the encoded representation in memory and pack 606 the build volume using the encoded representation. In some examples, caching may be enabled by default. For instance, the encoded representation (with the inner voxel quantities, for example) may be written to memory, which may save space. In some examples, determining 612 whether to cache the encoded representation may be based on a received input. For instance, an input from a user may be received via an input device (e.g., mouse, keyboard, touchscreen, etc.) indicating whether to enable or disable caching of the encoded representation.

In some examples, an operation or operations of the method 600 may be repeated. For instance, an operation or operations of the method 600 may be repeated for another iteration of a genetic procedure. In some examples, method 600 operation may end when a packing is determined.

Some examples of the techniques described herein may provide an implicit scheme of voxel encoding that allows a compact data structure and/or more efficient processing. For instance, build volume packing may be performed without instantiating inner voxels, which may be processed as a group or a batch aided by the encoding scheme. For instance, some examples of the techniques may increase the efficiency of packing procedures by allocating inner voxels in a group rather than individually. Some examples of the techniques may use surface voxels to describe a voxelated model. For instance, inner voxels may be implicitly encoded as distances or quantities of voxels between two surface voxels along a scanning direction (e.g., x, y, or z direction).

Some examples of the techniques described herein may provide for codification of inner voxels, which may reduce writing operations on disk and/or increase a loading speed for voxelated objects. In some examples, inner voxels may not be transformed explicitly during translation and/or 90° rotations, which may increase computational efficiency. In some examples, decoding may be performed to run collision queries.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be implemented within the scope of the disclosure. For example, aspects or elements of the examples described herein may be omitted or combined.

What is claimed is:

1. A method comprising:
   voxelizing a volumetric mesh model to determine a set of surface voxels, the volumetric mesh model being a three-dimensional (3D) object model to be printed using a 3D printer;

determining, for each surface voxel in the set of surface voxels determined, a first quantity of inner voxels in a first canonical direction, as determined from each surface voxel to another surface voxel based on distance and voxel size; and generating an encoded representation of the 3D object model, the encoded representation indicating a location of each surface voxel defined using x, y, and z axes and indicating the first quantity of inner voxels that are associated with each surface voxel in the set of surface voxels; and determining a packing of a build volume of the 3D printer based on the encoded representation by evaluating each of a plurality of randomized rotations of the set of surface voxels without rotation of the first quantity of inner voxels of the encoded representation.

2. The method of claim 1, wherein determining the first quantity of inner voxels comprises:
determining the first quantity of inner voxels for a first surface voxel in the set of surface voxels;
determining that a second surface voxel lies in the first canonical direction from the first surface voxel when two coordinate values of the second surface voxel are the same as two coordinate values of the first surface voxel;
determining whether a non-surface voxel between the first surface voxel and the second surface voxel is an inner voxel; and
calculating the first quantity of inner voxels in response to determining that the non-surface voxel is an inner voxel.

3. The method of claim 2, wherein calculating the first quantity of inner voxels comprises:
determining a distance between the first surface voxel and the second surface voxel; and
calculating the first quantity of inner voxels based on the distance and a voxel size.

4. The method of claim 1, wherein determining the packing a build volume of the 3D printer based on the encoded representation comprises determining a score for each of the plurality of randomized rotations of the set of surface voxels and ranking each of the plurality of randomized rotations of the set of surface voxels based on the score.

5. The method of claim 4, wherein the plurality of randomized rotations of the set of surface voxels are generated by one or more of:
rotating a pitch angle of the set of surface voxels;
rotating a yaw angle of the set of surface voxels;
rotating a roll angle of the set of surface voxels;
or any combination thereof.

6. The method of claim 5, wherein rotating the encoded representation is constrained to 90°, 180°, and 270° rotations.

7. The method of claim 4, wherein determining the packing comprises:
decoding the encoded representation to produce a decoded representation; and
performing collision detection based on the decoded representation.

8. The method of claim 1, further comprising caching the encoded representation.

9. An apparatus comprising:
a memory;
a processor coupled to the memory, wherein the processor is configured to:
voxelize a volumetric mesh model to determine a set of surface voxels, the volumetric mesh model being a three-dimensional (3D) object model of an object to be printed using a 3D printer;
determine, for each surface voxel in the set of surface voxels determined, a first quantity of inner voxels in a first canonical direction, as determined from each surface voxel to another surface voxel based on distance and voxel size;
generate an encoded representation of the 3D object model of the object to be printed using a 3D printer, the encoded representation indicating a location of each surface voxel encoded using x, y, and z axes and indicating the first quantity of inner voxels that is associated with each surface voxel in the set of surface voxels;
determine a packing of a build volume of the 3D printer based on the encoded representation by evaluating each of a plurality of randomized rotations of the set of surface voxels without rotation of the first quantity of inner voxels; and
pack the build volume of the 3D printer based on evaluating the encoded representation.

10. The apparatus of claim 9, wherein the processor is to cache the encoded representation in the memory.

11. The apparatus of claim 10, wherein the processor is to load the cached encoded representation from the memory to pack the build volume.

12. A non-transitory tangible computer-readable medium storing instructions that when executed cause a processor of an electronic device to perform a method, the medium comprising:
voxelize a volumetric mesh model to determine a set of surface voxels, the volumetric mesh model being a three-dimensional (3D) object model to be printed using a 3D printer;
determine, for each surface voxel in the set of surface voxels determined, a first quantity of inner voxels in a first canonical direction, as determined from each surface voxel to another surface voxel based on distance and voxel size;
generate a first encoded representation of the 3D object model based on the first canonical direction, the first encoded representation indicating a location of each surface voxel encoded using x, y, and z axes and the quantity of inner voxels in the first canonical direction from the surface voxel, the first quantity of inner voxels being associated with the surface voxel in the encoded representation;
determine a packing of a build volume of the 3D printer based on the first encoded representation by evaluating each of a plurality of randomized rotations of the set of surface voxels without rotation of the first quantity of inner voxels of the first encoded representation; and
pack the build volume of the 3D printer based on evaluating the first encoded representation.

13. The non-transitory tangible computer-readable medium of claim 12, wherein the instructions when executed cause the processor to:
generate a second encoded representation of the 3D object model based on a second canonical direction; and
error checking the first encoded representation based on the second encoded representation.

14. The non-transitory tangible computer-readable medium of claim 13, wherein the instructions when executed cause the processor to:
decode the first encoded representation to produce a first decoded representation;

decode the second encoded representation to produce a second decoded representation; and compare the first decoded representation and the second decoded representation to error check the first encoded representation.

* * * * *